United States Patent Office 3,632,531
Patented Jan. 4, 1972

3,632,531
POLYURETHANE FOAMS FROM AROMATIC
POLYISOCYANATE AND METHYLOL RESIN
Donald J. Rush, Grandview, and Howard W. Christie, Kansas City, Mo., and Thomas J. Byerley, Shawnee Mission, Kans., assignors to Midwest Research Institute, Kansas City, Mo.
No Drawing. Filed Aug. 25, 1967, Ser. No. 663,249
Int. Cl. C08g 22/44
U.S. Cl. 260—2.5 AJ                    8 Claims

ABSTRACT OF THE DISCLOSURE

Foamed polyurethane resins which are fire retardant and heat resistant, prepared from an aromatic polyisocyanate and a methylol resin which is the reaction product of a methylol resin former and an aldehyde. The foam is preferably post cured. The character of the methylol resin and the reaction parameters for preparing the methylol resin and the foam are so controlled as to provide fire retardant and heat resistant characteristics in the foamed products.

BACKGROUND OF THE INVENTION

Many of the urethane foams which are now in use are based on the reaction of polyether alcohols, hydroxy terminated polyesters or other polyhydroxy compounds. These materials produce highly flammable foams unless they are modified by the addition of inorganic fire retardants or by the use of phosphorous and/or halogen compounds which may be polyalcohols. While these methods can be used to reduce flammability, they increase the cost, reduce the strength and high temperature resistance and increase the smoke developed by burning of the resulting foams.

DESCRIPTION OF THE PRIOR ART

It has heretofore been suggested that foams from phenolic methylol resins (usually referred to as resoles) can be produced in the presence of small amounts of isocyanates.

British Pat. No. 908,303 describes the preparation of phenolic foams from resoles in a process in which an aqueous resole resin is mixed with minor amounts of a polyisocyanate plus sufficient acid curing catalyst to cure the resole. In this type of reaction system, however, the isocyanate is used primarily as a source of blowing gas, namely, carbon dioxide which results from the reaction of the isocyanate with the relatively large amounts of water present. What is more, the high acid concentrations used in this type of synthesis would be corrosive to metal panels when the foam is applied directly against the panel, and the presence of the strong acid inhibits the water-isocyanate reaction, thus producing more dense foams.

U.S. Pat. No. 2,608,536 to Sterling describes another method for the preparation of cellular phenolic resin foams from resoles utilizing a large excess of the resole over a polyisocyanate, using a nitrogen gas blowing agent and using heat as the reaction initiator. We have found that such large ratios of resole to polyisocyanate are not desirable from the standpoint of the flame retarding and heat resistance properties of the finished foam, as well as providing a significantly higher density product.

U.S. Pat. No. 3,271,331 to Ender deals with phenolic foams produced from resole resins and stabilized by certain organosilicon compounds. Insofar as the production of the foam itself is concerned, however, the described procedures utilize only small quantities of isocyanates relative to the amount of resole present. To the extent, the foam is of the type produced in accordance with the Sterling patent.

SUMMARY OF THE INVENTION

The reaction system of the present invention includes a resin having reactive methylol groups having a pH preferably of not less than 3.0, having a water content not in excess of about 10%, and preferably not above 5% by weight, in combination with an aromatic polyisocyanate in the ratio of about ½ to 1 equivalent weight of polyisocyanate to 1 equivalent weight of the methylol resin in the presence of an alkaline medium to produce a self-foaming product. In terms of weight ratio, the amount of methylol resin ranges from about 0.6 to 5 parts per part of polyisocyanate. In the case of phenolic resole resins, particularly good results are obtained when the ratio of resole to polyisocyanate is in the range from about 0.6 to 1.3 parts by weight for every part by weight of the polyisocyanate.

While the phenolic methylol resins represent the preferred form of the invention, similar results can also be obtained starting with methylol resins based upon compounds such as urea, melamine, aniline, and p-toluene sulfonamide. To improve the physical properties of the foamed resins, it is suggested that the foamed product be cured at a temperature of from 250 to 500° F., or so, for periods of time averaging about one-half to one hour. Longer times can be used, but are not usually necessary. This post curing significantly improves the resistance of the foam product to heat and direct flame.

DESCRIPTION OF THE PREFERRED EMBODIMENTS

The starting material in the present invention is a methylol resin, sometimes known as an A-stage resin. These resins are characterized by having a plurality of reactive methylol groups and have functionalities of at least 2. A typical methylol resin can be produced by reacting one mole of phenol with two moles of formaldehyde under basic conditions as, for example, a pH of 8 to form methylol phenols according to the following equation:

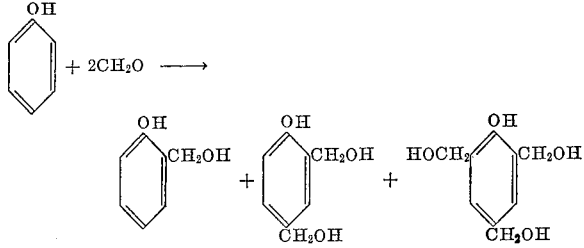

The formation of the mono, di and trimethylol phenols occurs along with polymerization of these substituted phenols into higher molecular weight compounds. It is desirable to limit this polymerization in order to obtain low viscosity resins. Polymerization of the methylol phenols takes place under basic conditions to form complex polymeric materials with both methylene and ether linkages. These reactions are highly complicated and are described in the literature (e.g., Carswell, T. S., "Phenolplasts," Interscience, New York, N.Y., 1947).

The methylol resin produced with a mole ratio of 2 to 1 (formaldehyde to phenol) yields an average mixture of disubstituted phenols, if no polymerization takes place. If the resin were all dimethylol phenol, the compound would have a hydroxy equivalent weight of 77 in terms of reactive methylol groups and 51 in terms of total hydroxy groups. The phenolic hydroxy group is not nearly as reactive as the methylol groups and can be disregarded. Since some polymerization does take place, the equivalent weight of the resin can be validly assumed to be in the range of about 80 to 120 grams.

The polyisocyanates use in accordance with the present invention have a functionality equal to or greater than 2 and thus can create cross-linked resins when reacting with a difunctional polyol. The major reaction occurs between the isocyanate groups and the methylol groups of the resole to create urethane linkages. At the moderate temperatures of reaction, ranging from about 27° C. to about 120° C., very little phenolic condensation takes place. Post curing of the foam changes the physical properties of the foam making it strong, more fire resistant, and more heat resistant.

Some of the reaction conditions which are preferably observed in the manufacture of the resole itself are evident from the following specific example of a procedure for producing a resole:

Example I

Liquefied phenol, (88 wt. percent in water) 341 g. (300 g. phenol) and 518 g., 37 percent aqueous Formalin (192 g. $CH_2O$) was charged into a 3-liter resin kettle fitted with a stirrer, sampling device, a nitrogen inlet, and condenser. Sodium hydroxide, 6 g. in 40 ml. $H_2O$ was added and the reaction mass brought to 85–90° C. The nitrogen was bubbled through the solution during heating for a period of 1.25 hr. After cooling to 30–40° C., the reaction mass was brought to a pH of 5 with approximately 40 ml. of 10 percent sulfuric acid and then water was removed at 30–40 mm. Hg. Approximately 430 ml. $H_2O$ was removed to produce a resole of 3.0–3.5 wt. percent residual $H_2O$. The temperature of the reaction mass was kept below 60° C. during removal of the $H_2O$. After completion of the water removal the amount of residual $CH_2O$ was determined and found to be 4.0 g./100 cc., viscosity was 3,690 cps. (Brookfield, No. 3 Spindle, 30 r.p.m.) at 25° C., and stroke cure time was 73 sec. at 180° C.

The mole ratio of this example was 2.0 mole $CH_2O$ per mole phenol. It has been found that ratios of 1.8–2.5 mole $CH_2O$ per mole phenol will produce a usable resole. A ratio of 2 to 1 has been found most satisfactory in terms of reactivity, residual $CH_2O$ (which should be kept at a minimum) and viscosity (10,000 cps. or less is desirable).

After the water was removed, the resin was filtered to remove the residual and insoluble sodium sulfate produced during the neutralization reaction. A light straw colored resole was obtained. Accurate determination of the water content was made using the Karl Fischer method.

The resole can be prepared by reacting at a lower (50° C.) temperature for a longer period or at reflux (94° C.) for a shorter period. It is necessary that the reaction be stopped at a time that will produce a resole of 2.0 to 4.0 wt. percent $H_2O$ with a viscosity (25° C.) of less than 20,000 cps. (less than 10,000 cps. desirable) and a stroke cure time at 180° C. of 50 to 80 sec. Some unreacted formaldehyde will be present in the resole and should be kept under 4.0 g./100 cc., with less than 2.0 g./100 cc. being desirable.

By maintaining the pH of the resole at 5.0 or less the viscosity of the resole does not increase rapidly at room temperatures and is quite stable at 5 to 15° C. The pH of the resole should not be less than 3.0 in order to suppress novolac formation. Decreasing the water content below 1.0 wt. percent produces a resole with a high (greater than 50,000 cps.) viscosity that is difficult to mix and handle.

Resoles of the type produced in Example I can be reacted with an aromatic polyisocyanate under suitable conditions to provide the improved products of the present invention. Any of the polyisocyanates ordinarily used in polyurethane foam production can be used in the process of the present invention, and the following is a representative list of such polyisocyanates:

TABLE I

Polyphenylmethylisocyanate (e.g., "PAPI" (polymethylene polyphenylisocyanate containing about 31% NCO)
Tolylene diisocyanates
3,3'-dimethyldiphenylmethane 4,4'-diisocyanate
Diphenylmethane 4,4'-diisocyanate The reaction medium for forming the foam also includes a suitable catalyst of the type used in polyurethane foam formation. The following list sets forth representative catalysts which can be employed in this process:

TABLE II

Dibutyl tin diacetate
Dibutyl tin dilaurate
Zinc acetate
Sodium acetate
Mixture of triethylene diamine and dimethylethanolamine
Mixtures of the acetates of mercury(ic), zinc, and sodium
Mixtures of amines and tin esters Our experiments have indicated that a ratio of 1.3 to 1.0 parts of resole to 1.0 part of an aromatic diisocyanate (based on an isocyanate containing about 31% NCO) provides the best foam in terms of cream time, rise time, heat resistance and physical strength. Starting with a resole within this compositional range, it was determined that a water content of less than about 3% by weight, and preferably from 1 to 3% by weight provided the best overall physical properties in the foam.

The flammability of the foams was evaluated in a chimney-type test utilizing a simple glass fronted, square, aluminum lined chimney that was 2.25 inches by 2.25 inches. by 12 inches. A Bunsen burner flame was adjusted so that the inner and outer flame cones were 1 to 1¼ inches long and evidenced an inner flame temperature of 1750±10° F. This flame was held in contact with a ¾ inch by ¾ inch by 5 inch long piece of foam mounted vertically in the chimney, for a period of 10 seconds. The time of burning and the weight retained after burning was determined and recorded. The following table shows the results obtained under various conditions:

| Resole (grams) | "PAPI" (grams) | Water (weight percent) | Burn time (sec.) | Weight percent retained | Comments |
|---|---|---|---|---|---|
| 78.5 | 31.5 | 3.1 | (¹) | (¹) | |
| 70.0 | 40.0 | 3.1 | (¹) | (¹) | |
| 49.0 | 61.0 | 3.1 | 16.1 | 62.3 | R.T. cure. |
| | | | 11.6 | 69.3 | 275° F. cure. |
| 60.5 | 49.0 | 3.1 | 12.2 | 75.3 | R.T. cure. |
| | | | 9.7 | 84.3 | 275° F. cure. |
| 60.0 | 50.0 | 3.1 | 11.6 | 73.6 | R.T. cure. |
| | | | 9.8 | 84.3 | 275° F. cure. |
| 55.0 | 55.0 | 3.1 | 12.7 | 69.7 | R.T. cure. |
| | | | 9.7 | 76.4 | 275° F. cure. |
| 49.0 | 61.0 | 3.1 | 11.6 | 69.2 | R.T. cure. |
| | | | 12.2 | 75.3 | 275° F. cure. |
| 60.0 | 50.0 | 1.5 | 12.2 | 75.3 | R.T. cure. |
| | | | 9.7 | 84.3 | 275° F. cure. |
| 60.0 | 50.0 | 2.5 | 11.6 | 74.7 | R.T. cure. |
| | | | 9.2 | 79.1 | 275° F. cure. |
| 60.0 | 50.0 | 3.1 | 11.6 | 73.6 | R.T. cure. |
| | | | 9.8 | 84.3 | 275° F. cure. |
| 60.0 | 50.0 | 4.5 | 13.3 | 70.1 | R.T. cure. |
| | | | 11.2 | 77.9 | 275° F. cure. |
| 60.0 | 50.0 | 5.5 | 14.5 | 76.6 | R.T. cure. |
| | | | 9.4 | 79.4 | 275° F. cure. |
| Commercial polyol isocyanate foam.² | | 21.5 | | 27.9 | Cure unknown. |

¹ Not tested.
² Nonburning by ASTM D 1692.

The effect of extended post curing on the foams is illustrated in the following table, utilizing foams of the type employed in the previous examples:

| Resole (grams) | "PAPI" (grams) | Foam density (lbs./ft.³) | Comp. strength (p.s.i.) | Burn time (sec.) | Weight percent retained |
|---|---|---|---|---|---|
| (A) 275° F. post cure for 1 hour | | | | | |
| 92 | 77 | 1.90 | 26.9 | 10.4 | 88.7 |
| 92 | 77 | 1.87 | 27.4 | 10.2 | 86.4 |
| (B) 325° F. post cure for 1 hour | | | | | |
| 109 | 91 | 2.58 | 21.8 | 3.0 | 98.0 |
| (C) 355° F. post cure for 1 hour | | | | | |
| 92 | 77 | 1.58 | 21.3 | 10.0 | 95.6 |
| 92 | 77 | 1.73 | 19.3 | 10.0 | 94.7 |
| (D) 355° F. for 30 min., then 400° F. for 45 min. post cure | | | | | |
| 109 | 91 | 3.15 | 32.3 | 7.0 | 97.9 |
| 109 | 91 | 3.16 | 20.9 | 8.0 | 97.7 |
| 109 | 91 | 3.80 | 40.0 | 2.0 | 98.2 |
| 109 | 91 | 3.10 | 34.2 | 1.0 | 98.0 |
| (E) 375° F. for 1 hour post cure | | | | | |
| 85 | 85 | 1.68 | 24.0 | 8.0 | 95.6 |

Foams designated A through C were made from a resole containing 2.8% water, while those designated D and E were made from a resole containing 3.1% water.

While the foregoing example deals with foams prepared from phenolic type resoles, the improvements of the present invention can also be obtained using, as a starting material, polymethylol derivatives of other compounds which form thermo-setting resins as evidenced from the following examples.

Example II

The pH of 600 ml. of a 40% aqueous formaldehyde solution was adjusted to a value of 7.5 to 8.0 with 10% aqueous sodium hydroxide. Urea in the amount of 120 grams was dissolved in this solution and brought to reflux for two hours. A total of 344 ml. of water was removed under vacuum (40 to 50 mm. Hg), leaving a colorless, viscous fluid. The mole ratio of formaldehyde to urea was 4 to 1. The solids content of the resin obtained was 68%, which value was determined by heating a known weight of resin at 150° C. for 2 hours. A high residual formaldehyde content of approximately 12 wt. percent was found.

The foam was produced from the above product with the following procedure. Two drops of dibutyl tin dilaurate as catalyst and 10 drops of concentrated ammonium hydroxide were mixed into 20 grams of the resin with a high speed mixer for 20 seconds. Then, 20 grams of "PAPI" (polyphenylmethylisocyanate) were mixed into the resin for 30 seconds. A cream time of 30 seconds was obtained and the foam evidenced a rise time of 150 seconds. The foam was fine-celled with a density of 1.2 to 1.5 lbs. per cubic foot and would withstand 1 hour heating at 205° C. without excessive shrinkage or discoloration.

Example III

Melamine in an amount of 126 grams was added to 825 grams of a 40% aqueous formaldehyde solution, and the pH of the solution was adjusted to 7.0. The mixture was heated for 1½ hours at 80° C. and then 490 ml. of water was removed under a vacuum of 40 to 50 ml. of mercury. A water-clean syrup was obtained.

A foam was produced from this polymethylol melamine by mixing 20 grams of the resin with 3 drops of dibutyl tin dilaurate and 15 drops of concentrated ammonium hydroxide. Then, 20 grams of the "PAPI" polyisocyanate was added and mixed at high speed for 30 seconds. The mixture foamed in 20 seconds, and had a rise time of 150 seconds. A strong, light foam was obtained which withstood a temperature of 205° C. for 1 hour. The foam structure would flame when exposed to a Bunsen burner flame, but the flame immediately extinguished itself.

Example IV

Aniline in an amount of 186 grams was mixed with 300 ml. of benzene and 4 grams of sodium carbonate, after which 300 grams of a 40% aqueous formaldehyde solution were added with stirring. An exothermic reaction occurred. The temperature of the reaction mixture was held between 36° C. and 40° C. with a cold water bath. The mixture was held at this temperature for 1 hour and 15 minutes. The two phases were formed during the reaction. The organic top layer was separated and washed with 60 ml. of cold aqueous 5% sodium sulfate solution. The organic layer was then washed 3 times with 100 ml. portions of distilled water. The benzene was removed in a flash evaporator to produce 230 g. of a white viscous resin. The residual formaldehyde content of the resin was 8.1 g. per 100 ml.

Twenty grams of the resin were combined with 2 drops of dibutyl tin dilaurate as catalyst, and 5 drops of concentrated ammonium hydroxide, with thorough mixing. Then 20 grams of "PAPI" polyisocyanate were added and thoroughly mixed. A foam structure with a cream time of 10 seconds and a rise time of 1.5 minutes was obtained.

Example V

One mole (171 g.) of p-toluene sulfonamide was dissolved in 500 ml. of ether containing 5 g. sodium carbonate. To this mixture were added 150 g. of 40% aqueous formaldehyde (2 moles). The mixture was stirred at 30° C. for 3 hours. The two resulting phases were separated in a separatory funnel, and the water layer was discarded. The ether was removed by vacuum distillation in a flash evaporator to yield a white viscous syrup.

Thirty grams of the resin were mixed with 3 drops of dibutyl tin dilaurate, 15 drops of concentrated ammonium hydroxide and 10 grams of "PAPI." The foam which was produced had a cream time of 50 seconds and a rise time of 2.5 minutes.

Preparation of phenol-formaldehyde resoles with low viscosity, low water content and low residual free formaldehyde.—We have also found that by increasing the amount of sodium hydroxide used to catalyze the reaction, resoles with much lower free formaldehyde and lower viscosity can readily be obtained. Apparently the formation of sodium phenate followed by reaction of the sodium phenate with formaldehyde, produces more unpolymerized methylol phenols than with low (as previously described) sodium hydroxide-catalyst levels.

EXAMPLE VI

The procedures used in producing these resoles are as follows: Sodium hydroxide (as a 50 percent solution in water) was added to an 88 percent phenol to form the sodium phenate. This reaction was quite rapid and gave off heat, thus requiring that it be performed in a cooled, jacketed reactor at temperatures not exceeding 60° C. After the reaction was completed, the mixture was cooled to 25° C. and the formaldehyde was added. Upon heating to 60° C. to 70° C. the reaction started and went to reflux (93–95° C.), without further heating. Reaction times were quite short, usually being less than 5 minutes as opposed to 1.25 hours given above in Example I. After the reaction was complete the mixture was brought to a pH of 4.0 to 4.5 with 50 percent sulfuric acid, and the water was removed by decantation of the two phases that formed and by vacuum stripping of the organic phase at 2–10 mm. Hg and 40–50° C. Given in tabular form the results obtained are as shown in the following table.

| Reactants | | | | Product | | |
|---|---|---|---|---|---|---|
| Moles phenol | Moles formaldehyde | Moles NaOH | Reaction time in minutes | Viscosity, cps. (25° C.) | Free formaldehyde, g./100 ml. | Residual water, weight percent |
| 7.0 | 14.0 | 7.0 | 1.5 | 1,600 | 0.2 | 5.0 |
| 5.0 | 10.0 | 2.5 | 2.5 | 3,500 | 0.4 | 4.8 |
| 5.0 | 10.0 | 1.25 | 4.5 | 23,000 | 0.4 | 3.3 |
| 5.0 | 10.0 | 1.0 | 1.5 | 2,900 | 0.45 | 3.8 |
| 7.0 | 17.5 | 7.0 | 1.5 | 6,500 | 1.61 | 3.3 |
| 7.0 | 21.0 | 7.0 | 5.0 | 8,200 | 4.3 | 4.4 |

It should be noted that the sodium hydroxide-to-phenol ratio (in moles) was 1.0 to 1.0, 0.5 to 1.0, 0.25 to 1.0 and 0.2 to 1.0 for the first four above-listed examples. The last two examples used 1 mole of NaOH for each mole of phenol but the last two examples used increased amounts of formaldehyde, viz 2.5 to 1.0 ($CH_2O$ to phenol) and 3.0 to 1.0 while the NaOH-to-phenol ratio was held at 1.0 to 1.0. To keep the free formaldehyde at a minimum, we prefer to use from 1 to 4 moles of formaldehyde to every mole of sodium hydroxide.

These resoles are much more reactive with the polyisocyanates than those typical of Example I. No catalyst is required to produce a foam reaction. Cream times as short as 20 seconds are obtained with complete rise in temperature occurring in 60 to 80 seconds. High rises (light foams) are produced quite rapidly. Post cure of these foams yielded a flame resistant foam.

The polyurehane foams produced according to the present invention have a majority of urethane linkages rather than a minority of such linkages, as in the case of prior art foams produced from resoles. The polyurethane foams of the present invention are characterized by low cost compared with conventional polyurethane foams which use more expensive alkylene oxide derived polyol sources. Furthermore, many of the foam products produced according to the present invention have a stability toward flame and heat which is better than that possessed by other types of polyurethane foam.

The foams produced by the method herein described are "nonburning" when tested in accordance with the specifications outlined in ASTM Method D-1692-59T, "Test for Flammability of Plastic Foams and Sheeting."

The foams of the present invention find particular utility for bonding to metal panels in the manufacture of lightweight structural members, as thermal insulating materials, and in the packaging of delicate articles.

It should be evident that various modifications can be made to the described embodiments without departing from the scope of the present invention.

We claim as our invention:

1. A fire-retardant, heat-resistant polyurethane foam produced by reacting (1) a methylol resin comprising the reaction product of formaldehyde with a methylol resin former selected from the group consisting of phenol, urea, melamine, aniline and p-toluene sulfonamide solely with (2) an aromatic polyisocyanate, said methylol resin having a pH of not less than 3.0 and having a water content not in excess of about 10% by weight, the reaction being carried out in the presence of an alkaline medium with the ratio of about 0.6 to 1.3 parts by weight of methylol resin to every part by weight of polyisocyanate.

2. The foam of claim 1 which has been cured at a temperature of from 250 to 500° F.

3. The foam of claim 1 in which said methylol resin has a water content not in excess of about 3% by weight and a viscosity not in excess of 50,000 centiposes at 25° C.

4. The foam of claim 1 in which said methylol resin former is phenol.

5. The foam of claim 1 in which said methylol resin former is urea.

6. The foam of claim 1 in which said methylol resin former is melamine.

7. The foam of claim 1 in which said methylol resin former is aniline.

8. The foam of claim 1 in which said methylol resin former is p-toluene sulfonamide.

References Cited

UNITED STATES PATENTS

| | | | |
|---|---|---|---|
| 2,608,536 | 8/1952 | Sterling | 260—2.5 |
| 2,906,717 | 9/1959 | Sekmakas | 260—2.5 |
| 3,271,331 | 9/1966 | Ender | 260—2.5 |

OTHER REFERENCES

Gould, Phenolic Resins, Reinhold, 1959, pp. 36–39.
Bakelite Technical Bulletin No. 8, 1935, pp. 1–3.

DONALD E. CZAJA, Primary Examiner

M. J. WELSH, Assistant Examiner

U.S. Cl. X.R.

260—2.5 AM, 59